INVENTOR.
ALBERT B. JEWELL
BY
Julian L. Siegel
ATTORNEY 3,357,017
SYSTEM FOR OBTAINING DIFFERENCE CURVES
OF STACKED BEAM ANTENNAS
Albert B. Jewell, Glen Burnie, Md., assignor, by mesne assignments, to the United States of America as represented by the Secretary of the Air Force
Filed Sept. 2, 1966, Ser. No. 577,099
4 Claims. (Cl. 343—17.7)

ABSTRACT OF THE DISCLOSURE

A system for plotting difference curves in which a stacked beam antenna having a pair of radiation elements is rotated through a target beam and the received radiation is detected with a pair or bolometers each of which is fed to logarithmic amplifiers with outputs of opposite polarities which are then summed. A difference curve is plotted as a function of rotational azimuth and a marker indicates a reference azimuth.

---

This invention relates to microwave measurements and more particularly to a system for plotting difference curves of stacked beam antennas.

In the past method of plotting difference curves of stacked beam antennas, the antenna is rotated clockwise through a target beam to record the pattern of the first test beam. The second test beam is then substituted and the antenna is rotated counterclockwise to the starting position of the first beam, then rotated clockwise recording the pattern of the second test beam. These steps are performed on separate charts for each test frequency required. The difference curve of the beam pair is then hand plotted and transferred to another chart, forming the difference curve frequency spread. On this curve the antenna height accuracy is determined and the computer slope is set.

The principal disadvantages of the past method are the introduction of error by hand plotting and transferring of the curves, the change in slope of the difference curves caused by variation in the target beam intensity and/or the recording equipment during the lapse between the recording of the first and second test beam. The error caused by synchro-slippage on backlash in the pedestal drive arises because of the two antenna sweeps necessary. Another disadvantage is the amount of time consumed by hand plotting and the quantity of patterns necessitated by this method.

It is therefore an object of this invention to provide a system for plotting difference curves of a stacked beam antenna that eliminates hand plotting and the attendant errors.

It is another object to provide a system for plotting difference curves that offers a greater savings in time.

It is still another object to provide an improved method of plotting difference curves of stacked beam antennas on the same chart showing frequency spread.

These and other advantages, features and objects of the invention will become more apparent from the following description taken in connection with the illustrative embodiments in the accompanying drawings, wherein.

Figure 1:
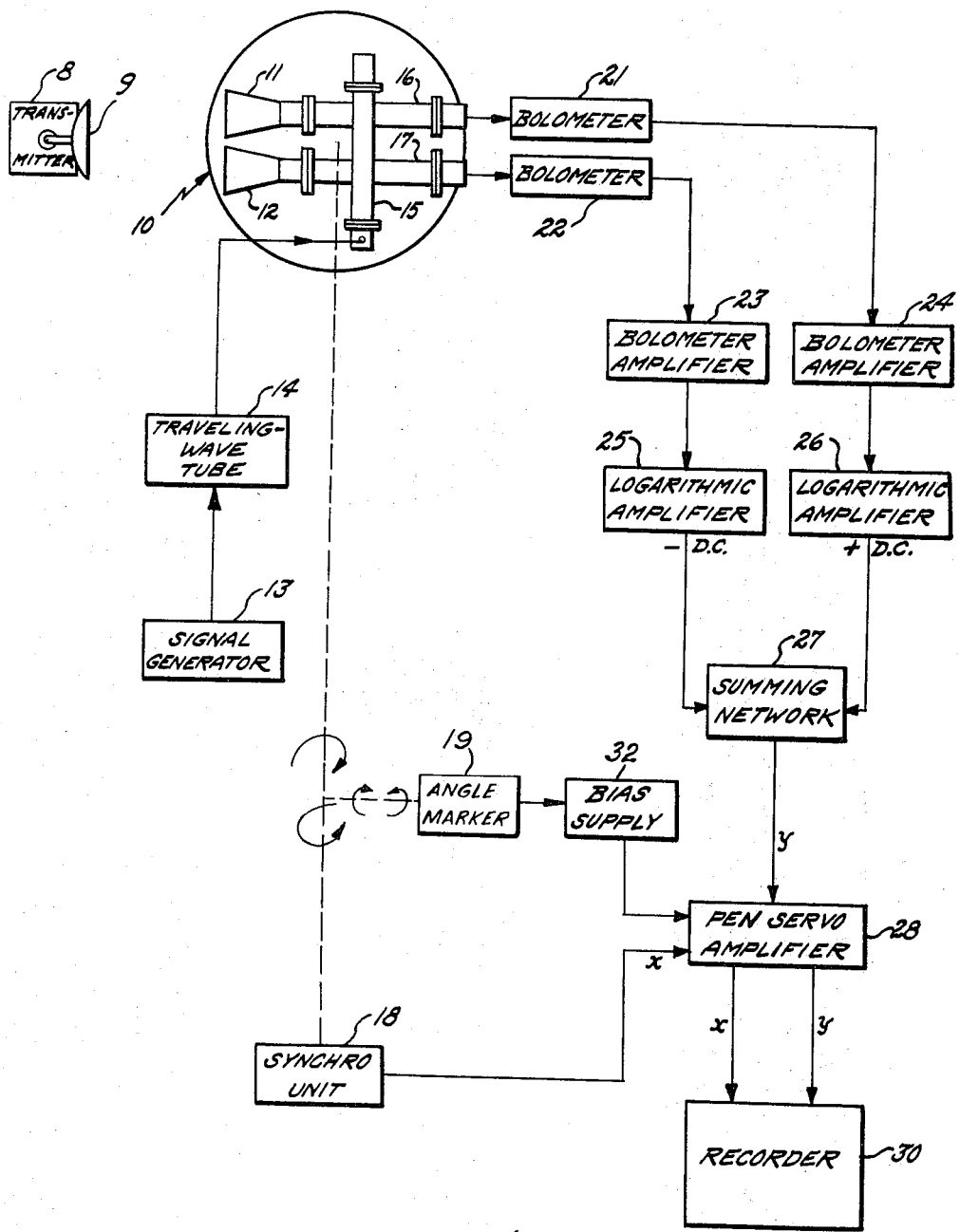
FIGURE 1 shows the first embodiments of the invention.
Figure 2:
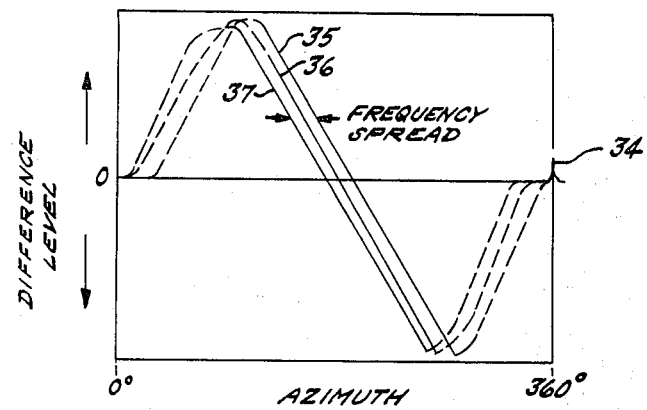
FIGURE 2 shows a record of the difference curves of a beamed pair employing the embodiment of FIGURE 1.

Stacked beam antenna 10 under test comprises horns 11 and 12 each of which are connected to matching broadband bolometers 21 and 22. Each bolometer is connected to tuned amplifiers 23 and 24 and the outputs are fed to logarithmic amplifiers 25 and 26. One logarithmic amplifier has a positive D.C. output and the other logarithmic amplifier has a negative D.C. output. These outputs are summed across resistive summing network 27 which is connected to the pen servo amplifier 28 of recorder 30 which is also fed by synchro unit 181 for indicating the azimuth of stacked beam antenna 10. Also at this point there is applied a D.C. bias voltage from bias source 32 of sufficient potential to cause the recorder pen to deflect to the midscale position of the chart. The gain of the channels is balanced by feeding an external signal from signal generator 13 amplified by traveling wave tube 14 to matched cross guide coupler 15 and then to wave guide runs 16 and 17 of the beam pair under test. The gain of tuned amplifiers 23 and 24 is adjusted to position the recorder pen at the bias level. An angle reference marker 19 is provided by using a microswitch and cam arrangement to interrupt the recorder bias at a fixed reference azimuth. Spike 34 shown at FIGURE 2 is recorded on pattern at this angle. The external signal is removed and the antenna is rotated clockwise, past the reference marker and through the target beam from target antenna 9, thereby recording the difference curve 35 of the beam pair under test at a given frequency. Target transmitter 8 is changed to the next required frequency and the antenna is rotated counterclockwise out of the target beam causing curve 36 to be traced on the chart. The external signal from generator 13 is again applied and the system balance is checked. The external signal is removed and stacked beam antenna 10 is rotated clockwise retracing the reference marker through the target beam, recording difference curve 37 of the beam pair for the new frequency on the same chart with previous curve 35 forming a difference curve frequency spread. If the reference marker does not retrace the angular difference between the marks it must be taken into account when the height error of the frequency spread is computed.

Figure 3:
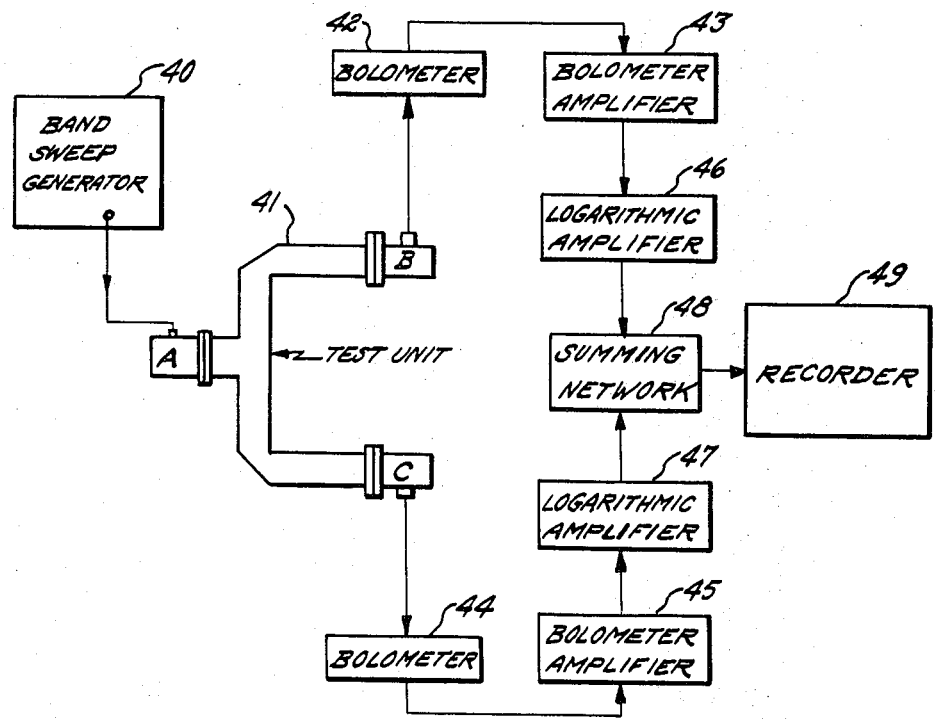
FIGURE 3 shows an embodiment of the invention when used for other microwave measurements.

The time and accuracy advantage can also be realized for other microwave measurements, such as gain, coupling, isolation, and insertion loss, by use of equipment shown in FIGURE 3 in which unit 41 is under test. The system is balanced by butting transition A and B and setting the reference level bolometer amplifier 43 which is connected to bolometer 42. This is repeated substituting C for B and setting the gain of bolometer amplifier 45 which is connected to bolometer 44 at the same level as bolometer amplifier 43. The frequency band is then swept with generator 40. The difference of the two channels is taken at summing network 48 via logarithmic amplifiers 46 and 47. A zero centered meter or recorder 49 records the power division spread of the band.

What I claim is:
1. A system for plotting difference curves of a stacked beam antenna in rotation with each antenna having a pair of radiation elements, the system comprising:
   (a) a pair of broadband bolometers, one each connected to each radiation element;
   (b) a pair of amplifiers having logarithmic outputs, one each connected to each broadband bolometer with one having a positive D.C. output and the other having a negative D.C. output;
   (c) means for summing the outputs of the amplifiers;
   (d) means for detecting antenna rotational position;
   (e) and an antenna pattern recorder fed by the outputs of the summing means and the rotational position detecting means.

2. A system for plotting difference curves according to claim 1 which further comprises:
   (a) a signal generator fed to each radiation element for balancing the system prior to plotting;
   (b) and a bias supply connected to the antenna pattern recorder for zero centering the recorder.

3. A method of plotting difference curves of stacked beam antenna having a pair of radiation elements comprising:
 (a) rotating the antenna through a target beam;
 (b) detecting the radiation output of each radiation element;
 (c) differencing the radiation outputs;
 (d) recording a difference curve as the antenna is rotated, the difference being a function of the antenna azimuth;
 (e) recording a mark as the antenna rotates past a reference azimuth marker;
 (f) reverse rotating the antenna placing the antenna in the initial position;
 (g) changing the frequency of the target beam;
 (h) and rotating again in the initial direction forming a second difference curve, the separation of the difference curve representing the frequency spread.

4. A method of plotting difference curves according to claim 3 which further comprises:
 (a) balancing the radiation elements prior to rotation, the balancing including injecting a constant signal into each radiation element and adjusting the amplification;
 (b) and biasing the recording for zero centering.

References Cited

UNITED STATES PATENTS 3,153,760  10/1964  Henderson _____ 343—17.7 X

RODNEY D. BENNETT, *Primary Examiner.*

T. H. TUBBESING, *Assistant Examiner.*